United States Patent
Mason

(10) Patent No.: US 9,339,020 B1
(45) Date of Patent: May 17, 2016

(54) FISH HANGER

(71) Applicant: Robert O. Mason, Waynesboro, MS (US)

(72) Inventor: Robert O. Mason, Waynesboro, MS (US)

(*) Notice: Subject to any disclaimer, the term of this patent is extended or adjusted under 35 U.S.C. 154(b) by 0 days.

(21) Appl. No.: 14/940,320

(22) Filed: Nov. 13, 2015

(51) Int. Cl.
*A22C 25/00* (2006.01)
*A01K 97/00* (2006.01)

(52) U.S. Cl.
CPC .............. *A01K 97/00* (2013.01); *A22C 25/00* (2013.01); *A45F 2200/05* (2013.01)

(58) Field of Classification Search
CPC ..... A22C 15/00; A22C 15/003; A22C 15/005
USPC .................................. 452/185, 187–193, 198
See application file for complete search history.

(56) References Cited

U.S. PATENT DOCUMENTS

| | | | | | |
|---|---|---|---|---|---|
| 3,199,820 | A | * | 8/1965 | Thompson | A22C 25/06 248/222.41 |
| 4,346,499 | A | * | 8/1982 | Young | A22B 5/06 452/125 |
| 4,580,317 | A | * | 4/1986 | Timothy | A22B 5/06 294/81.56 |
| 4,977,643 | A | * | 12/1990 | Prysock | A22C 25/00 452/187 |
| 5,100,365 | A | * | 3/1992 | Johnson | A22B 5/06 452/187 |
| 7,544,120 | B1 | * | 6/2009 | Tardif | A01M 31/006 452/187 |
| 2012/0252338 | A1 | * | 10/2012 | VerWys | A22B 7/002 452/189 |

* cited by examiner

*Primary Examiner* — Richard Price, Jr.

(57) ABSTRACT

An improved fish hanger is provided where the hanger is constructed of, or at least made of, lightweight metal. The fishing hanger has a molded body with a curved bottom end that allows the body to pivot on a flat surface. This curved end of the fish hanger is able to hook a fish in a position that makes the skinning process possible on both sides. The device can be collapsible for ease of transport and storage.

14 Claims, 1 Drawing Sheet

FISH HANGER

CROSS REFERENCE TO RELATED APPLICATIONS

Not applicable.

FEDERALLY SPONSORED RESEARCH & DEVELOPMENT

Not applicable.

MICROFICHE APPENDIX

Not applicable.

BACKGROUND OF THE INVENTION (1) Field of the Invention

This invention relates to fish hanger, and, more specifically, to an apparatus and method that can help skin fish. The present invention relates more to a portable fish hanging objects, such as from trees.

(2) Background of the Invention

The present invention relates to the field of fishing. More specifically, the invention relates to metal fishing hangers and methods for making the same. Various shapes and types of hangers have been developed over the years, many of which are comprised of heavy steel hangers that are generally capable of withstanding high impact and other forces when, for example, a hanger is set in a fish. After a fish has been caught, the hanger has to be released from the mouth of the fish, but this is often difficult because the barb at the end of the fishhook is lodged inside of the fish to prevent its removal, as is its normal function. Removal of a fish hanger is easier if the barb is lodged just inside the mouth of the fish, but is difficult and sometimes impossible if the hook has been completely swallowed and is deep inside the fish. Thus, there are times that a fisherman loses their hanger and must dissect a fish to recover it.

Heretofore, the skinning of fish has presented a difficult, messy job, which required the fish be held in such manner that complete access might be had thereto without the fish slipping through the hands of the person skinning the fish. Furthermore, there was always the possibility of a knife slipping, resulting in injury to the person skinning the fish.

In the prior art, there are fish hooks with hinged and otherwise rotatable barbs that are moved to allow for easier removal of the fish hook from the mouth of a fish. With one prior art fish hook disclosed and claimed in U.S. Pat. No. 3,505,756, the barb is literally hinged. A fish caught with such a fish hook must be removed from the water, and the fisherman must reach inside the mouth of the fish to rotate the barb to a position that permits the fish hook to be removed without causing further harm to the mouth of the fish. This is difficult and sometimes impossible if the hook is caught deep inside the mouth of the fish.

U.S. Pat. No. 4,977,643, to Prysock, discloses a fish supporting apparatus. The apparatus is adapted to be used for supporting fish during skinning, scaling, or other cleaning operations. More specifically, the device includes a brace support structure with two upper downwardly-angled support arms that support the outer end of a third horizontal support arm. The inner ends of all three arms are fastened to a vertical support member. Furthermore, a hook is suspended from a chain that is supported by the brace support structure that is secured to a mouth or head portion of the fish to suspend the fish for convenient cleaning operations. While the Prysock support intends to be fixed to a tree, its attachment is more of a permanent one. Bolts, as well as spikes, must be driven into the tree. This requires additional tools and time.

U.S. Pat. No. 3,199,820, to Thomson, discloses a support for hanging fish, game, and the like. The support hanger may be readily attachable to a stable support. Further, the support hanger facilitates the attachment of a fish thereto in such manner that the fish may be rotated about a vertical axis, to make possible the cutting open, skinning, or cleaning of the fish. More specifically, the support hanger includes an aperture bracket.

The present invention is a fish hanging apparatus and improved method of handling the skinning process, since it enables a person seeking to skin a fish the ability to skin the fish while it remains the moving positioning of the fish at all. The entire process can be accomplished with rotation the fish from its initial placement on the invention

SUMMARY OF THE INVENTION

The present invention surpasses the limitations of the prior art and discloses a fish hanger made by assembling different parts. The invention can be assembled anywhere and can be kept in a small string.

With this invention, after the assembling of pieces, fish can be mounted on the fish hanger. The hanger may be mounted permanently or temporarily at fishing places.

The device is easy to use, as this improved fish hanger is portable and in a stationary position when mounted on wall or tree. With this invention, fish can be rotated for skinning from both sides.

As described above, the advantage of the present invention is that the users hand is not getting finned. The user is able to use both hands to pull back the skin. This device is made of light weight metal, so that it is easy to carry and store.

These and other advantages will be apparent from the disclosure of the invention(s) contained herein. The above-described embodiments, objectives, and configurations are neither complete nor exhaustive. Other embodiments of the invention are possible using, alone or in combination, one or more of the features set forth above or described in detail below. Furthermore, the summary of the invention is neither intended nor should it be construed as being representative of the full extent and scope of the present invention.

BRIEF DESCRIPTION OF THE DRAWINGS

To further clarify various aspects of some example embodiments of the present invention, a more particular description of the invention will be rendered by reference to specific embodiments thereof, which are illustrated in the appended drawing. It is appreciated that the drawing depicts only illustrated embodiments of the invention, and are, therefore, not to be considered limiting of its scope. The invention will be described and explained with additional specificity and detail through the use of the accompanying drawing, in which.

DETAILED DESCRIPTION OF THE INVENTION

The following detailed description refers to the accompanying drawings that illustrate the embodiments of the present invention. Other embodiments are possible, and modifications may be made to the embodiments without departing from the spirit and scope of the invention. Therefore, the following detailed description is not meant to limit the invention. Rather, the scope of the invention is defined by the appended claims.

Skinning is labor-intensive and difficult; a sharp knife and flat board made of metal or plastic or a hook are needed. The fillet is placed on the board skin-down while the meat is grasped in the left hand and the knife is drawn between the skin and meat. A piece of metal or other hard material curved or bent back at an angle, for catching hold of or hanging fish on it for skinning process, is used. Conventional fishing hooks are made of one form or another of metal. However, the present materials (stainless steel, probably representing the best performing material) are not optimal, at least when compared to the fishing hook of the present invention, as will be disclosed hereafter.

Figure 1:
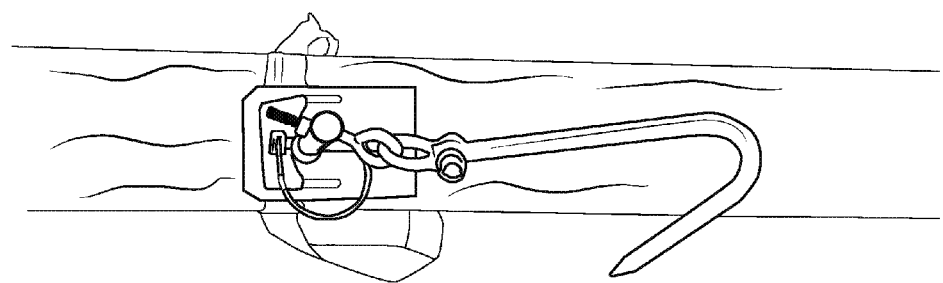
FIG. 1 depicts a perspective view of the present invention attached to a tree.

The present invention offers significant improvements in skinning fish in conjunction with fishing. The inventive hanging device is easily mounted to any tree FIG. 1, and does not require any branches or other means for fish to support. Furthermore, the device uses the weight of the fish to assist in stabilizing the device once the fish is hung. The invention is especially useful in places where there is a lack of stands or other structures that can be readily used to suspend a fish.

The fish hanger is available in metal structures, and, after the assembling of these metal structures, the device is able to hang a fish on the fish hanger permanently or temporarily at fishing places.

The disclosed invention is easy to use, as this improved fish hanger is either portable or at a stationary position on a wall or tree. With this invention, fish can be rotated for skinning from both sides.

Figure 2:
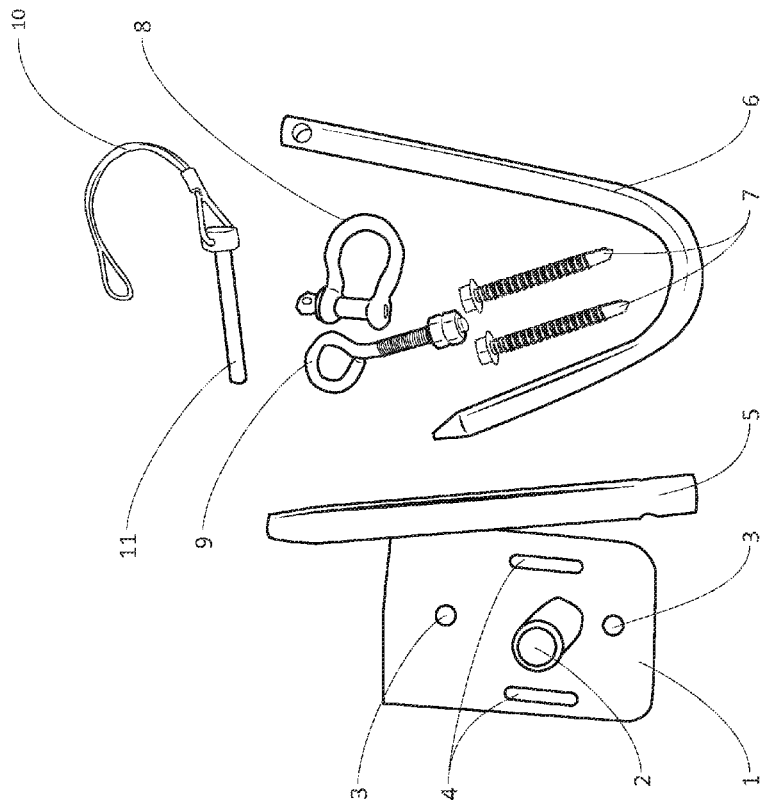
FIG. 2 depicts the elements of the present invention.

The fish hanger is made of lightweight metal and is easy to carry to the fishing places. A metal plate is also attached to the assembly, for mounting on walls or trees. As it shown in FIG. 2, all parts of the device can be separated from each other for easy transportation. The figure shows a metal base 1 is provided to support the assembly, and is mounted on a tree with a couple of slots 4, and holes 3. The metal base 1 is secured against the surface of tree using two or more screws 7 that go through the holes 3 provided. The metal base 1 also has a hollow protruded pipe structure 2 for accommodating a round bar support 5 that is solid and cylindrical in shape with an opening in it to allow an eye bolt 9. The eyebolt 9 is mounted for pivotal movement, if desired, while skinning the hanging fish, though the eye bolt 9 is secured against pivoting. The eye bolt 9 is in connection with a D-shackle 8 fitted into the eye of a fishing hanger 6. The round bar support 5 also has a through hole that is in sync with a through hole in hollow pipe like structure 2 to accommodate a solid bolt 11 with a link 10 attached to its head portion. The link 10 is provided to secure the bolt 11 with round bar support 5. The hexagonal screws 7 are provided to go through holes 3 to secure the metal base 1 against a tree.

The main advantage of the present invention is that the fish hanger allows the rotation of both sides, which makes the skinning process easier. The user's hand is not getting finned, the user is able to use both hand, and user is able to pull back the skin.

It is to be understood that the above description is intended to be illustrative, and not restrictive. For example, the above-discussed embodiments may be used in combination with each other. Many other embodiments will be apparent to those of skill in the art upon reviewing the above description. It is to be understood that the above description is intended to be illustrative, and not restrictive. For example, the above-discussed embodiments may be used in combination with each other. Many other embodiments will be apparent to those of skill in the art upon reviewing the above description.

Plural instances may be provided for components, operations, or structures described herein as a single instance. Finally, boundaries between various components are somewhat arbitrary, and particular operations are illustrated in the context of specific illustrative configurations. Other allocations of functionality are envisioned, and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

I claim:

1. A fish hanger assembly for skinning fish comprising:
   a metal base having a first surface and second surface;
   a protruded hollow pipe structure coming out of metal base having a first end and a second end;
   a round bar support having a first end and second end;
   a fishing hanger with eye;
   a D-shackle; and
   an eye bolt.

2. The fishing hanger assembly of claim 1, wherein said metal base is attached to the first end of said protruded hollow pipe structure.

3. The fishing hanger assembly of claim 1, wherein said first end of said round bar support is adapted to go inside of said protruded hollow pipe structure.

4. The fishing hanger assembly of claim 1, wherein said eye bolt is adapted to go through a hole on second end of said round bar support.

5. The fishing hanger assembly of claim 1, wherein said D-shackle is connected to said eye bolt.

6. The fishing hanger assembly of claim 1, wherein said fishing hanger with eye is pivotally connected with said D-shackle.

7. The fishing hanger assembly of claim 1, wherein said fishing hanger assembly is made of a lightweight metal.

8. The fishing hanger assembly of claim 1, wherein said fishing hanger is used for skinning process of fish.

9. The fishing hanger assembly of claim 1, wherein said metal base is a plate.

10. The fishing hanger assembly of claim 9, wherein said plate is secured against a tree by two or more screws.

11. The fishing hanger assembly of claim 1, wherein an object can be hung from said hanger with eye.

12. The fishing hanger assembly of claim 11, wherein said fishing hanger with eye is able to rotate on both sides.

13. The fishing hanger assembly of claim 1, wherein said protruded hollow pipe structure is secured with said round bar support by a solid bolt with a link.

14. The fishing hanger assembly of claim 13, wherein the pivotal movement of round bar support is restricted using said solid bolt with said link.

* * * * *